US008628846B2

(12) United States Patent
Wakabayashi et al.

(10) Patent No.: US 8,628,846 B2
(45) Date of Patent: Jan. 14, 2014

(54) DEVELOPER CARRYING MEMBER AND DEVELOPING UNIT

(71) Applicant: Canon Kabushiki Kaisha, Tokyo (JP)

(72) Inventors: Kazuhito Wakabayashi, Mishima (JP); Masayoshi Shimamura, Yokohama (JP); Yasutaka Akashi, Yokohama (JP); Satoshi Otake, Numazu (JP); Takuma Matsuda, Susono (JP); Minoru Ito, Susono (JP); Atsushi Noguchi, Numazu (JP); Hironori Mori, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/744,041

(22) Filed: Jan. 17, 2013

(65) Prior Publication Data

US 2013/0129392 A1 May 23, 2013

Related U.S. Application Data

(63) Continuation of application No. PCT/JP2012/005224, filed on Aug. 21, 2012.

(30) Foreign Application Priority Data

Sep. 6, 2011 (JP) ................................ 2011-193805

(51) Int. Cl.
*B32B 5/16* (2006.01)
*B32B 9/04* (2006.01)
*G03G 15/095* (2006.01)

(52) U.S. Cl.
USPC ......................... 428/323; 428/411.1; 399/264

(58) Field of Classification Search
None
See application file for complete search history.

(56) References Cited

U.S. PATENT DOCUMENTS

| | | | | |
|---|---|---|---|---|
| 6,122,473 | A | 9/2000 | Goseki et al. | |
| 6,258,498 | B1 | 7/2001 | Kawahara et al. | |
| 7,796,926 | B2 * | 9/2010 | Matsuda et al. | 399/286 |
| 8,059,997 | B2 * | 11/2011 | Otake et al. | 399/286 |
| 8,295,745 | B2 * | 10/2012 | Matsuda et al. | 399/286 |
| 8,372,570 | B2 * | 2/2013 | Matsuda et al. | 430/123.3 |
| 8,377,549 | B2 * | 2/2013 | Takayama et al. | 428/323 |
| 2010/0028792 | A1 | 2/2010 | Otake et al. | |
| 2011/0268477 | A1 | 11/2011 | Matsuda et al. | |

FOREIGN PATENT DOCUMENTS

| | | | |
|---|---|---|---|
| JP | 11-125966 | A | 5/1999 |
| JP | 2001-312136 | A | 11/2001 |
| JP | 2003-15403 | A | 1/2003 |
| JP | 2010-8878 | A | 1/2010 |
| WO | 2010/074102 | A1 | 7/2010 |
| WO | 2011/080922 | A1 | 7/2011 |
| WO | 2011/125304 | A1 | 10/2011 |

OTHER PUBLICATIONS

PCT International Search Report and Written Opinion of the International Searching Authority, International Application No. PCT/JP2012/005224, Mailing Date Oct. 2, 2012.
Otake, et al., U.S. Appl. No. 13/797,532, filed Mar. 12, 2013.
Ito, et al., U.S. Appl. No. 13/851,902, filed Mar. 27, 2013.

* cited by examiner

*Primary Examiner* — Sheeba Ahmed
(74) *Attorney, Agent, or Firm* — Fitzpatrick, Cella, Harper and Scinto

(57) ABSTRACT

Provided is a developer carrying member that can stably provide a negatively chargeable developer with triboelectric charge and whose surface hardly wears even after its long-term use. The developer carrying member is a developer carrying member, comprising: a substrate; and a surface layer, wherein: the surface layer contains a matrix resin and electro-conductive particles; and the matrix resin contains a crosslinked product of a polymer chain having units represented by the following structural formula (1) and the following structural formula (2), and a polymer chain represented by the following structural formula (3).

(1)

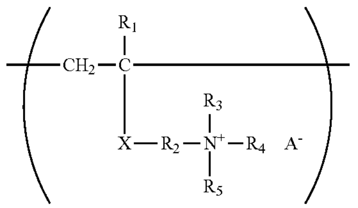

(2)

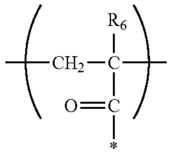

(3)

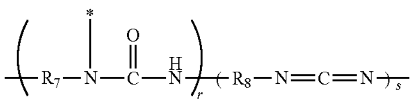

8 Claims, 3 Drawing Sheets

DEVELOPER CARRYING MEMBER AND DEVELOPING UNIT

CROSS-REFERENCE TO RELATED APPLICATIONS

This application is a continuation of International Application No. PCT/JP2012/005224, filed Aug. 21, 2012, which claims the benefit of Japanese Patent Application No. 2011-193805, filed Sep. 6, 2011.

BACKGROUND OF THE INVENTION

1. Field of the Invention

The present invention relates to a developer carrying member to be used in a developing unit for developing a latent image formed on a photosensitive drum in a recording method utilizing an electrophotographic method to visualize the latent image, and to a developing unit.

2. Description of the Related Art

In recent years, there have been growing demands from users in the market that an image-forming apparatus employing an electrophotographic method should have higher image quality and a longer lifetime. In such circumstances, it has become important to provide a developer carrying member capable of increasing a triboelectric charge quantity of a developer and stabilizing triboelectric charge-providing performance for the developer over a long time period. To solve the problem, Japanese Patent Application Laid-Open No. H11-125966 discloses a developer carrying member using a quaternary ammonium base-containing acrylic resin as a surface layer on a surface of its substrate. Japanese Patent Application Laid-Open No. H11-125966 describes that use of such developer carrying member can improve image quality and stabilize a printed image density. However, the developer carrying member has room for further improvement because the member is still unable to sufficiently meet the demands.

SUMMARY OF THE INVENTION

In view of the foregoing, the present invention is directed to providing a developer carrying member which can stably provide a negatively chargeable developer with negative triboelectric charge and whose surface hardly wears even after its long-term use. That is, the present invention is directed to providing a developer carrying member excellent in negative triboelectric charge-providing performance for the negatively chargeable developer, the performance being hardly changed even by the long-term use.

Further, the present invention is directed to providing a developing unit conducive to stably forming a high-quality electrophotographic image.

According to one aspect of the present invention, there is provided a developer carrying member, comprising: a substrate; and a surface layer, wherein: the surface layer contains a matrix resin and electro-conductive particles; and the matrix resin contains a crosslinked product of a polymer chain having units represented by the following structural formula (1) and the following structural formula (2), and a polymer chain represented by the following structural formula (3).

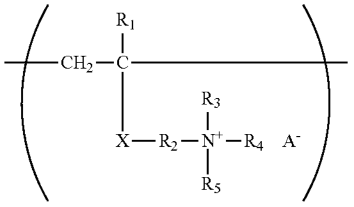

(1)

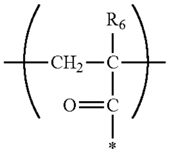

(2)

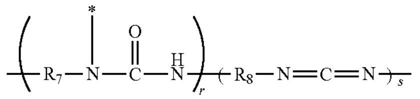

(3)

In the structural formula (1), $R_1$ represents a hydrogen atom or a methyl group, $R_2$ represents an alkylene group having 1 or more and 4 or less carbon atoms, at least one of $R_3$, $R_4$, and $R_5$ represents an alkyl group having 1 or more and 18 or less carbon atoms, and any other group represents an alkyl group having 1 or more and 5 or less carbon atoms, and $A^-$ represents an anion.

In the structural formula (2), $R_6$ represents a hydrogen atom, a methyl group, or an ethyl group.

In the structural formula (3), $R_7$ and $R_8$ each independently represent a hydrocarbon group having 1 or more and 12 or less carbon atoms. X represents one of —COO—, —CONH—, and —$C_6H_4$—, r represents an integer of 1 or more, and s represents 0, or an integer of 1 or more. * in each of the structural formulae (2) and (3) represents a bonding site of the structural formula (2) and the structural formula (3).

According to another aspect of the present invention, there is provided a developing unit, comprising: the above-described developer carrying member; and a developer layer thickness regulating member.

According to the present invention, there is provided the developer carrying member in which the triboelectric charge quantity of a developer is high and uniform and whose wear can be suppressed even after its long-term use. Accordingly, triboelectric charge-providing performance for the developer can be stabilized. As a result, a high-quality image which has a high image density and in which fogging hardly occurs can be stably obtained over a long time period.

Further features of the present invention will become apparent from the following description of exemplary embodiments with reference to the attached drawings.

DESCRIPTION OF THE EMBODIMENTS

Figure 1:
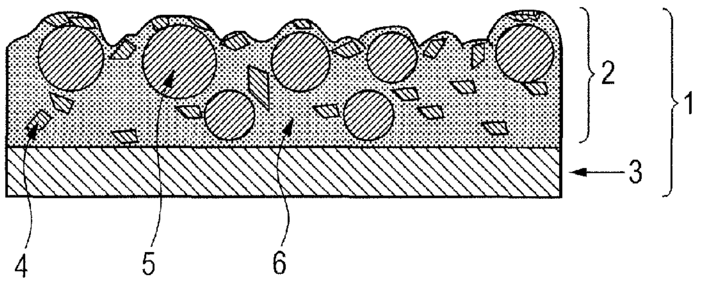
FIG. 1 is a schematic view illustrating a configuration of a section of the surface layer of a developer carrying member according to the present invention.

Preferred embodiments of the present invention will now be described in detail in accordance with the accompanying drawings.

<Developer Carrying Member>

A developer carrying member according to the present invention is described below.

The developer carrying member according to the present invention is a developer carrying member, including: a substrate; and a surface layer, in which: the surface layer contains a matrix resin and electro-conductive particles; and the matrix resin contains a crosslinked product of a polymer chain having units represented by the following structural formula (1) and the following structural formula (2), and a polymer chain represented by the following structural formula (3).

(1)

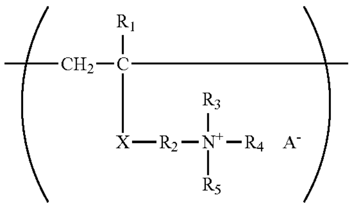

(2)

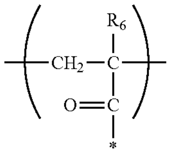

(3)

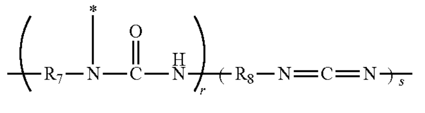

In the structural formula (1), $R_1$ represents a hydrogen atom or a methyl group, $R_2$ represents an alkylene group having 1 or more and 4 or less carbon atoms, at least one of $R_3$, $R_4$, and $R_5$ represents an alkyl group having 1 or more and 18 or less carbon atoms, and any other group represents an alkyl group having 1 or more and 5 or less carbon atoms, and $A^-$ represents an anion.

In the structural formula (2), $R_6$ represents a hydrogen atom, a methyl group, or an ethyl group.

In the structural formula (3), $R_7$ and $R_8$ each independently represent a hydrocarbon group having 1 or more and 12 or less carbon atoms. X represents one of —COO—, —CONH—, and —$C_6H_4$—, r represents an integer of 1 or more, and s represents 0, or an integer of 1 or more. * in each of the structural formulae (2) and (3) represents a bonding site of the structural formula (2) and the structural formula (3).

(Matrix Resin)

The matrix resin according to the present invention is a matrix resin having a three-dimensional crosslinked structure obtained by subjecting a carboxyl group moiety in a quaternary ammonium base-containing polymer and a polycarbodiimide compound to a dehydration condensation reaction. The outline of a reaction scheme for obtaining the matrix resin having the three-dimensional crosslinked structure is described below.

A monomer having a quaternary ammonium base represented by the following structural formula (4) and a monomer having a carboxyl group represented by the following structural formula (5) are copolymerized to yield a polymer having a unit represented by the following structural formula (6) and a unit represented by the following structural formula (7), in other words, a quaternary ammonium base-containing polymer having a carboxyl group in its structure.

(4)

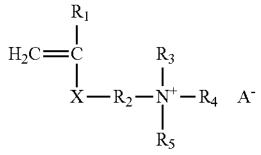

In the structural formula (4), $R_1$ represents a hydrogen atom or a methyl group, $R_2$ represents an alkylene group having 1 or more and 4 or less carbon atoms, at least one of $R_3$, $R_4$, and $R_5$ represents an alkyl group having 1 or more and 18 or less carbon atoms, and any other group represents an alkyl group having 1 or more and 5 or less carbon atoms, X represents one of —COO—, —CONH—, and —$C_6H_4$—, and $A^-$ represents an anion.

(5)

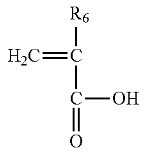

In the structural formula (5), $R_6$ represents a hydrogen atom, a methyl group, or an ethyl group. Specifically, the monomer is acrylic acid, methacrylic acid, or 2-ethylacrylic acid.

(6)

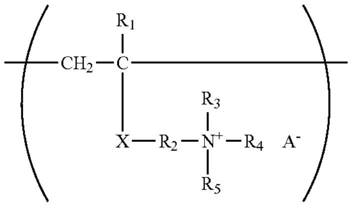

In the structural formula (6), $R_1$ represents a hydrogen atom or a methyl group, $R_2$ represents an alkylene group having 1 or more and 4 or less carbon atoms, at least one of $R_3$, $R_4$, and $R_5$ represents an alkyl group having 1 or more and 18 or less carbon atoms, and any other group represents an alkyl group having 1 or more and 5 or less carbon atoms, X represents one of —COO—, —CONH—, and —$C_6H_4$—, and $A^-$ represents an anion.

(7)

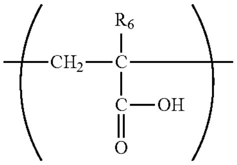

In the structural formula (7), $R_6$ represents a hydrogen atom, a methyl group, or an ethyl group.

A carboxyl group moiety of the resin formed of the quaternary ammonium base-containing polymer containing the structural formula (6) and the structural formula (7) undergoes a condensation reaction with a polycarbodiimide represented by the following structural formula (8).

$$-(R_7-N=C=N)_n- \quad (8)$$

In the structural formula (8), $R_7$ represents a hydrocarbon group having 1 or more and 12 or less carbon atoms.

The matrix resin of the present invention containing the crosslinked product of the polymer chain represented by the structural formula (1) and the structural formula (2) and the polymer chain represented by the structural formula (3) is produced by the reaction. Details about the reaction are shown in the following reaction formula (1). It should be noted that a moiety except the carboxyl group of the quaternary ammonium base-containing polymer is represented by $R_0$ for simplicity. The polycarbodiimide reacts with a carboxylic acid as an acid to form an intermediate (a). After that, a transfer reaction occurs to yield a three-dimensional crosslinking reaction product as the final product.

Reaction formula (1)

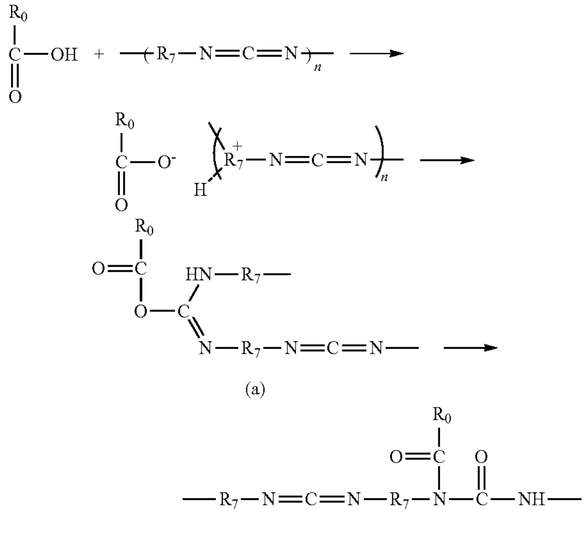

When $R_1$ in the structural formula (6) represents a hydrogen atom or a methyl group, steric hindrance hardly occurs and hence the three-dimensional crosslinking reaction sufficiently progresses. When $R_2$ in the structural formula (6) represents an alkylene group having 1 or more and 4 or less carbon atoms, the three-dimensional crosslinked structure is densely formed and hence a resin excellent in wear resistance is obtained. When at least one of $R_3$, $R_4$, and $R_5$ in the structural formula (6) represents an alkyl group having 1 or more and 18 or less carbon atoms, and any other group represents an alkyl group having 1 or more and 5 or less carbon atoms, the three-dimensional crosslinking reaction sufficiently progresses. In addition, in particular, when at least one of $R_3$, $R_4$, and $R_5$ represents an alkyl group having 8 or more and 18 or less carbon atoms, triboelectric charge-providing performance for a negatively chargeable developer can be additionally improved. When $R_6$ in the structural formula (7) represents hydrogen, a methyl group, or an ethyl group, the steric hindrance hardly occurs and hence the three-dimensional crosslinking reaction sufficiently progresses.

The matrix resin thus obtained is a thermosetting resin and is of a three-dimensional crosslinked structure. Accordingly, in the case where the resin is used as the surface layer, the wear resistance of the surface layer drastically improves as compared with the case where a resin formed only of a quaternary ammonium base-containing polymer is used alone as the surface layer. An improvement in durability of the developer carrying member can be achieved by the improvement of the wear resistance of the surface layer and hence good image characteristics can be obtained from start to finish.

In addition, the polymer chain having the unit represented by the structural formula (1) and the unit represented by the structural formula (2) has an ammonium base as a functional group that causes the chain to express a triboelectric charge-providing effect, and hence can increase the negative triboelectric charge quantity of the negatively chargeable developer. In addition, when the polycarbodiimide having a nitrogen atom is used as a crosslinking agent, a crosslinked moiety also has negative triboelectric charge-providing performance. That is, the matrix resin according to the present invention can provide the negatively chargeable developer with high negative triboelectric charge with the aid of the polymer chain moiety having the unit represented by the structural formula (1) and the unit represented by the structural formula (2), and the crosslinked moiety. Accordingly, the developer carrying member according to the present invention is extremely excellent in uniform negative triboelectric charge-providing performance for the negatively chargeable developer.

The monomer represented by the structural formula (4) can be obtained by quaternizing a monomer represented by the following structural formula (9) with a quaternizing agent.

(9)

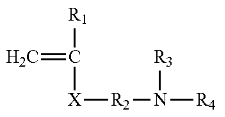

In the structural formula (9), $R_1$ represents a hydrogen atom or a methyl group, $R_2$ represents an alkylene group having 1 or more and 4 or less carbon atoms, and $R_3$ and $R_4$ each represent an alkyl group.

Examples of the quaternizing agent include the following compounds: alkyl halides such as butyl bromide, 2-ethylhexyl bromide, octyl bromide, lauryl bromide, stearyl bromide, butyl chloride, 2-ethylhexyl chloride, octyl chloride, lauryl chloride, and stearyl chloride; and organic acid compounds such as methyl p-toluenesulfonate, dimethylsulfuric acid, and methyl hydroxynaphthalenesulfonate.

When the usage of the quaternizing agent is set to 0.8 mol or more and 1.0 mol or less with respect to 1 mol of the monomer represented by the structural formula (9), the quaternization of the monomer can be sufficiently achieved. The quaternization of the monomer can be performed by, for example, heating the monomer and the quaternizing agent in a solvent to a temperature of 60° C. or more and 90° C. or less.

With regard to a composition ratio between the unit represented by the structural formula (6) and the unit represented by the structural formula (7), when the content of the unit represented by the structural formula (6) is represented by a and the content of the unit represented by the structural formula (7) is represented by b, a ratio a/(a+b) is preferably 0.3 or more and 0.8 or less. When the ratio falls within the range, the quaternary ammonium base moiety that mostly contributes to the provision of triboelectric charge and the carboxyl group moiety serving as a crosslinking point exist in a balanced manner, and hence compatibility between the provision of uniform, high triboelectric charge and high durability can be achieved. When multiple kinds of those respective units are incorporated into the resin, the total content of multiple kinds of units satisfying the structure represented by the structural formula (6) is represented by a and the total content of multiple kinds of units satisfying the structure represented by the structural formula (7) is represented by b.

In addition to the unit represented by the structural formula (6) and the unit represented by the structural formula (7), any other unit may be incorporated into the polymer chain. The content of the other unit to be incorporated into the polymer chain is preferably 30 mol % or less of the total number (mol) of the units. When the content of the other unit is set to 30 mol % or less, the effects of the unit represented by the structural formula (6) and the unit represented by the structural formula (7) are easily obtained.

(Method of Producing Matrix Resin)

A known polymerization method can be employed as a method of producing the resin formed of the quaternary ammonium base-containing polymer. Examples of the method include polymerization methods such as a bulk polymerization method, a solution polymerization method, an emulsion polymerization method, and a suspension polymerization method. Of those, a solution polymerization method is preferred because the reaction can be easily controlled. A solvent to be used in the solution polymerization method is a lower alcohol such as methanol, ethanol, n-butanol, or isopropyl alcohol. In addition, a solvent such as xylene, toluene, ethyl acetate, isobutyl acetate, methyl ethyl ketone, methyl isobutyl ketone, N,N-dimethylformamide, or dimethylformamide may be mixed before use as required. The usage of the solvent is preferably about 25 parts by mass or more and 330 parts by mass or less with respect to 100 parts by mass of the monomer component.

The polymerization of a single monomer or the copolymerization of a monomer mixture can be performed by, for example, heating the monomer or the mixture to 50° C. or more and 100° C. or less in the presence of a polymerization initiator under an inert gas atmosphere. Examples of the polymerization initiator which may be used include tert-butyl peroxy-2-ethylhexanoate, cumyl perpivalate, tert-butyl peroxylaurate, benzoyl peroxide, lauroyl peroxide, octanoyl peroxide, di-t-butyl peroxide, tert-butylcumyl peroxide, dicumyl peroxide, 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), and dimethyl 2,2'-azobis(2-methylpropionate).

One kind of the polymerization initiators may be used alone, or two or more kinds thereof may be used in combination. Although the polymerization initiator is typically added to a monomer solution to initiate the polymerization, part of the polymerization initiator may be added in the midst of the polymerization in order that the amount of an unreacted monomer may be reduced. A method involving promoting the polymerization through irradiation with UV light or an electron beam can also be employed, and those approaches may be combined. The usage of the polymerization initiator is set to preferably 0.05 part by mass or more and 30 parts by mass or less, more preferably 0.1 part by mass or more and 15 parts by mass or less with respect to 100 parts by mass of the monomer component. When the usage of the polymerization initiator is set to fall within the range, the amount of a residual monomer can be reduced and hence the control of the molecular weight of the matrix resin is facilitated.

Although a temperature for the polymerization reaction can be set depending on the solvent, the polymerization initiator, and the composition of the monomer component to be used, the polymerization reaction is preferably performed at 40° C. or more and 150° C. or less from the viewpoint of stably advancing the polymerization reaction.

In the present invention, $R_7$ in the structural formula (8) needs to represent a hydrocarbon group having 1 or more and 12 or less carbon atoms in order that the polycarbodiimide may be caused to serve as a crosslinking agent for advancing the three-dimensional crosslinking reaction. In particular, a polycarbodiimide having an aliphatic hydrocarbon group is more preferably used because the polycarbodiimide shows a small extent of steric hindrance, facilitates the progress of the crosslinking reaction, and provides a matrix resin excellent in wear resistance.

The polycarbodiimide represented by the structural formula (8) can be obtained by, for example, subjecting an organic diisocyanate to a decarboxylation reaction and a condensation reaction in the presence of a catalyst. Specific examples of the organic diisocyanate include an aliphatic diisocyanate, an aromatic diisocyanate, and an alicyclic diisocyanate, and examples thereof include the following diisocyanates.

Examples of the aliphatic diisocyanate include 1,4-diisocyanatobutane, 1,6-diisocyanatohexane, 1,12-diisocyanatododecane, and 1,5-diisocyanato-2-methylpentane. Examples of the aromatic diisocyanate include 1,3-phenylene diisocyanate, 1,4-phenylene diisocyanate, tolylene 2,4-diisocyanate, 1,5-naphthylene diisocyanate, and 4,4-diphenylmethane diisocyanate. Examples of the alicyclic diisocyanate include cyclohexane-1,4-diisocyanate, dicyclohexylmethane-4,4-diisocyanate, and methylcyclohexane diisocyanate. Those organic diisocyanates may be used alone or in combination of two or more kinds thereof.

In addition, the catalyst to be used at the time of the condensation reaction of the organic diisocyanate may be a known catalyst such as a phospholene oxide. Specific examples thereof include 1-ethyl-2-phospholene-1-oxide, 1-phenyl-2-phospholene-1-oxide, 3-methyl-2-phospholene-1-oxide, and 3-methyl-1-phenyl-2-phospholene-1-oxide. From the viewpoint of sufficiently advancing the condensation reaction, the usage of the catalyst is preferably 0.01 part by mass or more and 3.0 parts by mass or less with respect to 100 parts by mass of the organic diisocyanate.

From the viewpoint of sufficiently advancing the decarboxylation reaction and condensation reaction of the organic diisocyanate, the solvent to be used at the time of the condensation reaction is preferably an aprotic solvent. Specific examples thereof include solvents such as benzene, toluene, ethyl acetate, tetrahydrofuran, acetonitrile, and N,N-dimethylformamide. The condensation reaction is preferably performed at a temperature in the range of 60° C. or more and 160° C. or less, and is more preferably performed at 80° C. or more and 150° C. or less in order that the condensation reaction may be completed within a short time period and a product having a sharp molecular weight distribution may be obtained. The endpoint of the condensation reaction can be identified by sampling the reaction solution and analyzing the resultant sample by infrared spectroscopy to confirm the disappearance of a peak of an isocyanate group.

A terminal blocking agent may be added at the time of the condensation reaction for the purpose of controlling the molecular weight of the polycarbodiimide to be obtained. As a result, a functional group of the terminal blocking agent is bonded to a terminal of the polycarbodiimide and hence the molecular weight can be controlled to an appropriate one. Examples of such terminal blocking agent include organic monoisocyanates such as ethyl isocyanate, butyl isocyanate, phenyl isocyanate, and cyclohexyl isocyanate.

The usage of the terminal blocking agent is preferably 5 mol or more and 20 mol or less with respect to 100 mol of the organic diisocyanate. When the polycarbodiimide obtained by using the agent in the range is used, the durability of the matrix resin becomes sufficient.

The use of the polycarbodiimide thus obtained as a crosslinking agent can provide a three-dimensionally crosslinked matrix resin.

A method of producing the matrix resin of the present invention is, for example, a method involving: mixing the resin formed of the quaternary ammonium base-containing polymer having the unit represented by the structural formula (6) and the unit represented by the structural formula (7), and having a carboxyl group, and the polycarbodiimide represented by the structural formula (8) as a crosslinking agent; and heating the mixture. With regard to the unit constituent ratio of the matrix resin to be obtained, when the contents of the unit represented by the structural formula (1), the unit represented by the structural formula (2), and the unit represented by the structural formula (3) are represented by X, Y, and Z, respectively, a ratio X/(X+Y) is preferably 0.2 or more and 0.9 or less, and a ratio Z/Y is preferably 0.4 or more and 1.2 or less. Further, the ratio X/(X+Y) is more preferably 0.4 or more and 0.7 or less, and the ratio Z/Y is more preferably 0.6 or more and 1.0 or less. As long as the ratios fall within the ranges, the three-dimensional crosslinked structure is sufficiently formed and hence a surface layer formed of a matrix resin having high durability can be obtained. In addition, uniform, high negative triboelectric charge-providing performance for a developer can be obtained.

A heating temperature upon production of the matrix resin of the present invention is preferably 70° C. or more and 200° C. or less, more preferably 100° C. or more and 150° C. or less in order that the three-dimensional crosslinking reaction may be sufficiently advanced.

The matrix resin can also be obtained by simultaneously loading three components, i.e., the quaternary ammonium base-containing monomer represented by the structural formula (4), the monomer having a carboxyl group represented by the structural formula (5), and the polycarbodiimide represented by the structural formula (8) to perform a polymerization reaction. However, in order that the crosslinked structure may be constituted in an additionally dense manner to improve the durability of the resin layer, the following procedure is more preferably adopted. First, two components, i.e., the quaternary ammonium base-containing monomer represented by the structural formula (4) and the monomer containing a carboxyl group represented by the structural formula (5) are polymerized. After that, the three-dimensional crosslinking reaction is performed by adding the polycarbodiimide represented by the structural formula (8) to the resultant quaternary ammonium base-containing polymer.

In the structural formula (3) of the resultant matrix resin, r represents an integer of 1 or more, and s represents 0, or an integer of 1 or more. When the entirety of the polycarbodiimide represented by the structural formula (8) serving as a crosslinking agent reacts with the carboxyl groups of the quaternary ammonium base-containing polymer, r represents the same integer as that of n in the structural formula (8) and s represents 0. In addition, when only part of the polycarbodiimide reacts with the carboxyl groups of the quaternary ammonium base-containing polymer, s represents an integer of 1 or more and r represents an integer equal to n−s.

In addition, a ratio between r and s in the structural formula (3) can be determined by calculating each of the peak areas of carbonyl carbon and carbon forming an imide with a measuring apparatus such as a $^{13}$C-NMR apparatus.

In addition, the presence of the structural formula (1), the structural formula (2), and the structural formula (3) constituting the matrix resin of the developer carrying member of the present invention can be confirmed by using an analyzer such as a $^{1}$H-NMR or $^{13}$C-NMR apparatus.

FIG. 1 is a schematic sectional view illustrating part of the developer carrying member of the present invention. In FIG. 1, a surface layer 2 obtained by dispersing electro-conductive particles 4 and unevenness-providing particles 5 in a matrix resin 6 is laminated on a substrate 3 formed of a metal cylindrical tube.

In the developer carrying member of the present invention, the surface layer preferably has electro-conductivity. To this end, the volume resistivity of the surface layer is preferably $10^4$ Ω·cm or less, more preferably $10^{-1}$ Ω·cm or more and $10^3$ Ω·cm or less. Setting the volume resistivity to a value within the range makes it easy to stably and uniformly provide a developer with triboelectric charge. As a result, it becomes easy to stably obtain a good image having high image quality.

(Electro-Conductive Particles)

The surface layer of the developer carrying member of the present invention contains electro-conductive particles for adjusting its volume resistivity to a desired value.

Examples of the electro-conductive particles include: fine powders of metals such as aluminum, copper, nickel, and silver; electro-conductive metal oxides such as antimony oxide, indium oxide, tin oxide, titanium oxide, zinc oxide, molybdenum oxide, and potassium titanate; crystalline graphite; various types of carbon fibers; and electro-conductive carbon black such as furnace black, lamp black, thermal black, acetylene black, and channel black.

Of those, the electro-conductive carbon black, in particular, electro-conductive amorphous carbon is suitably used because such material is particularly excellent in electro-conductivity and imparts electro-conductivity when loaded into a polymer material, and somewhat arbitrary electro-conductivity can be obtained merely by controlling its addition amount. In addition, the addition amount of the electro-conductive carbon black is preferably set to fall within the range of 1 part by mass or more and 100 parts by mass or less with respect to 100 parts by mass of the matrix resin, though the preferred range varies depending on the particle diameter of the carbon black. When the amount is set to fall within the range, the volume resistivity of the surface layer can be set to a desired level and the strength of the surface layer can be sufficiently held.

The crystalline graphite is also preferred because of the following reasons. The crystalline graphite is excellent in electro-conductivity, and the addition of the crystalline graphite to the surface layer raises the lubricity of its surface and improves the durability of the surface layer. Here, the addition amount of the crystalline graphite is preferably set to fall within the range of 1 part by mass or more and 100 parts by mass or less with respect to 100 parts by mass of the matrix resin, though the preferred range varies depending on the particle diameter of the crystalline graphite. When the amount is set to fall within the range, electro-conductivity and surface lubricity can be sufficiently imparted to the surface layer.

(Unevenness-Forming Particles)

Unevenness-forming particles for forming unevenness in the surface of the surface layer may be incorporated into the surface layer for the purpose of controlling the conveyance amount of the developer and triboelectric charge-providing performance therefor. The unevenness-forming particles are preferably spherical particles. When the particles are spherical particles, a developer carrying member having a desired surface roughness can be obtained with a smaller addition amount than that of irregular particles, and the developer carrying member has a surface shape with uniform uneven surface. The volume-average particle diameter of the spherical particles is preferably 3.0 μm or more and 30.0 μm or less. As long as the volume-average particle diameter falls within the range, uniform unevenness can be formed in the surface of the surface layer, and hence the stabilization of the conveyability of the developer and the optimization of the provision of triboelectric charge for the developer carrying member can be achieved.

The surface roughness of the surface layer of the developer carrying member of the present invention preferably falls within the range of 0.3 μm or more and 3.5 μm or less in terms of an arithmetic-mean roughness Ra specified in JIS B0601-2001. As long as the surface roughness falls within the range, the conveyance amount of the developer is properly maintained, which enables the stabilization of the provision of triboelectric charge for the developer and the maintenance of an image density.

(Formation of Surface Layer)

A method of forming the surface layer of the developer carrying member of the present invention may be, for example, a method of obtaining the surface layer by dispersing and mixing the respective components in a solvent to prepare a paint, applying the paint onto the substrate, and drying the applied paint. A known dispersing apparatus utilizing beads such as a sand mill, a paint shaker, a Dyno-mill, or a pearl mill or medialess dispersion which does not utilize beads can be suitably utilized in the dispersion and mixing of the respective components. In addition, a known method such as a dipping method, a spray method, or a roll coating method is applicable to a method of applying the resultant paint.

(Substrate)

Examples of the substrate of the developer carrying member include a cylindrical member, a columnar member, and a belt-like member. In such a development method that the developer carrying member is non-contact with a photosensitive drum, a cylindrical tube or solid rod made of a rigid body such as a metal is preferably used. In particular, when the developer is of a magnetic, one-component type, a product obtained by molding a non-magnetic metal or alloy such as aluminum, stainless steel, or brass into a cylindrical shape and subjecting the resultant to a treatment such as polishing or grinding is suitably used as the substrate. Of those, aluminum is preferably used because of a material cost and the ease of processing. The arithmetic-mean roughness Ra of the surface of such substrate is preferably 0.5 μm or less from the viewpoint of forming a uniform surface layer.

<Developing Unit>

Figure 2:
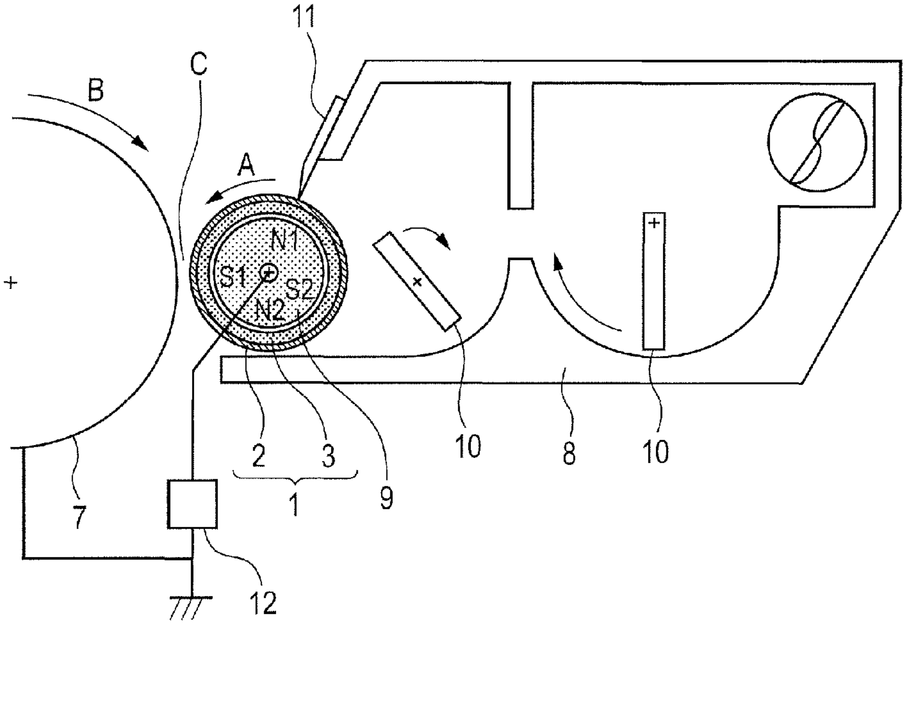
FIG. 2 is a schematic view illustrating an example of a magnetic, one-component developing unit using the developer carrying member according to the present invention, the unit having a magnetic regulating blade incorporated therein.

Next, a developing unit according to the present invention is described. FIG. 2 illustrates a section of a developing unit of an embodiment having the developer carrying member of the present invention. In FIG. 2, an electrostatic latent image-bearing member bearing an electrostatic latent image formed by a known process, e.g., a photosensitive drum 7 rotates in a direction indicated by an arrow B. The developer carrying member 1, which carries a one-component developer as a magnetic developer supplied by a developer container 8, rotates in a direction indicated by an arrow A to convey the developer to a developing region C where the developer carrying member and the photosensitive drum are opposite to each other. As illustrated in FIG. 2, a magnet roller 9 into which a magnet has been incorporated is placed in the developer carrying member for magnetically sucking and holding the developer on the developer carrying member.

The developer carrying member to be used in the developing unit according to the present invention has the surface layer 2 with which the top of the substrate 3 is covered. Stirring blades 10 for stirring the developer are provided in the developer container. The developer is provided with triboelectric charge capable of developing the electrostatic latent image on the photosensitive drum by friction between the molecules of the developer, and friction with the surface layer on the developer carrying member. In the example of FIG. 2, in order that the layer thickness of the developer to be conveyed to the developing region may be controlled, a magnetic regulating blade 11 made of a ferromagnetic metal as a developer layer thickness regulating member is placed opposite to the developer carrying member with a gap width of 50 to 500 μm from the surface of the developer carrying member. Lines of magnetic force from a magnetic pole N1 of the magnet roller converge on the magnetic regulating blade, whereby a thin layer of the developer is formed on the developer carrying member. In the present invention, a non-magnetic blade can be used instead of the magnetic regulating blade.

The thickness of the thin layer of the developer thus formed on the developer carrying member is preferably thinner than even the minimum gap between the developer carrying member and the photosensitive drum in the developing region. It is particularly effective to incorporate the developer carrying member of the present invention into a developing unit of a system in which the electrostatic latent image is developed with such thin layer of the developer as described above, i.e., a non-contact type developing unit. The developer carrying member of the present invention is applicable also to such a developing unit that in the developing region, the thickness of the developer layer is a thickness equal to or more than the minimum gap between the developer carrying member and the photosensitive drum, i.e., a contact type developing unit. In the following description, description is given by taking such non-contact type developing unit as described above as an example for avoiding the complexity of the description.

In order that the one-component developer having a magnetic developer carried by the developer carrying member may be flown, a developing bias voltage is applied from a developing bias power source 12 as bias unit to the developer carrying member. When a DC voltage is used as the developing bias voltage, a voltage between the electric potential of the image portion (region to be visualized by the adhesion of the developer) of the electrostatic latent image and the electric potential of the background portion thereof is preferably applied to the developer carrying member.

Figure 3:
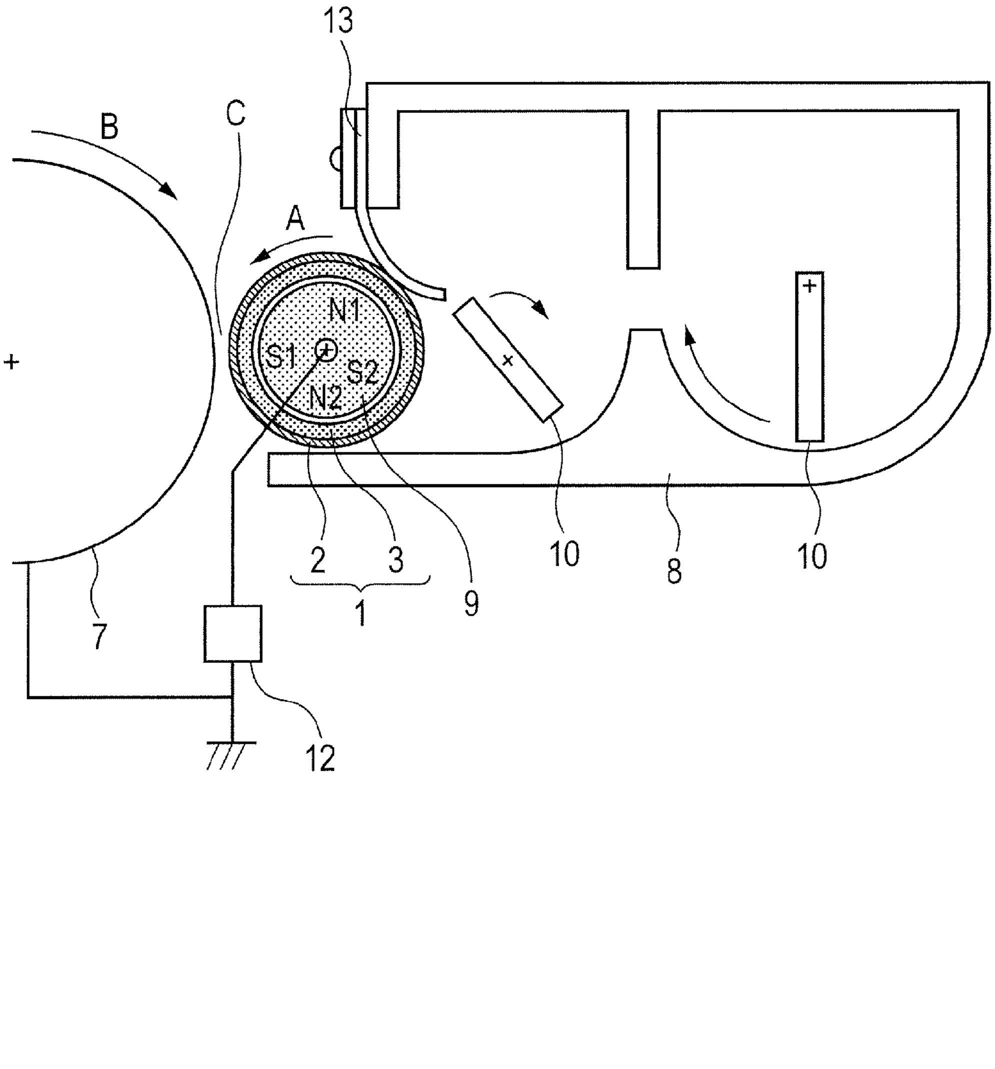
FIG. 3 is a schematic view illustrating another example of the magnetic, one-component developing unit using the developer carrying member according to the present invention, the unit having an elastic regulating blade incorporated therein.

FIG. 3 is a schematic sectional view illustrating another embodiment of the developing unit according to the present invention. In the developing unit illustrated in FIG. 3, an elastic blade 13 is used as a developer layer thickness regulating member for controlling the layer thickness of the developer on the developer carrying member. In addition, the elastic blade is brought into press contact so as to orient toward the direction opposite to the rotation direction of the developer carrying member. In the developing unit, the developer layer thickness regulating member is elastically brought into press contact with the developer carrying member through the developer layer to form a thin layer of the developer on the developer carrying member. Accordingly, a thin developer layer can be formed on the developer carrying member.

The other basic configuration in the developing unit of FIG. 3 is the same as that of the developing unit illustrated in FIG. 2, and members represented by the same reference numeral are the same member.

Figure 4:
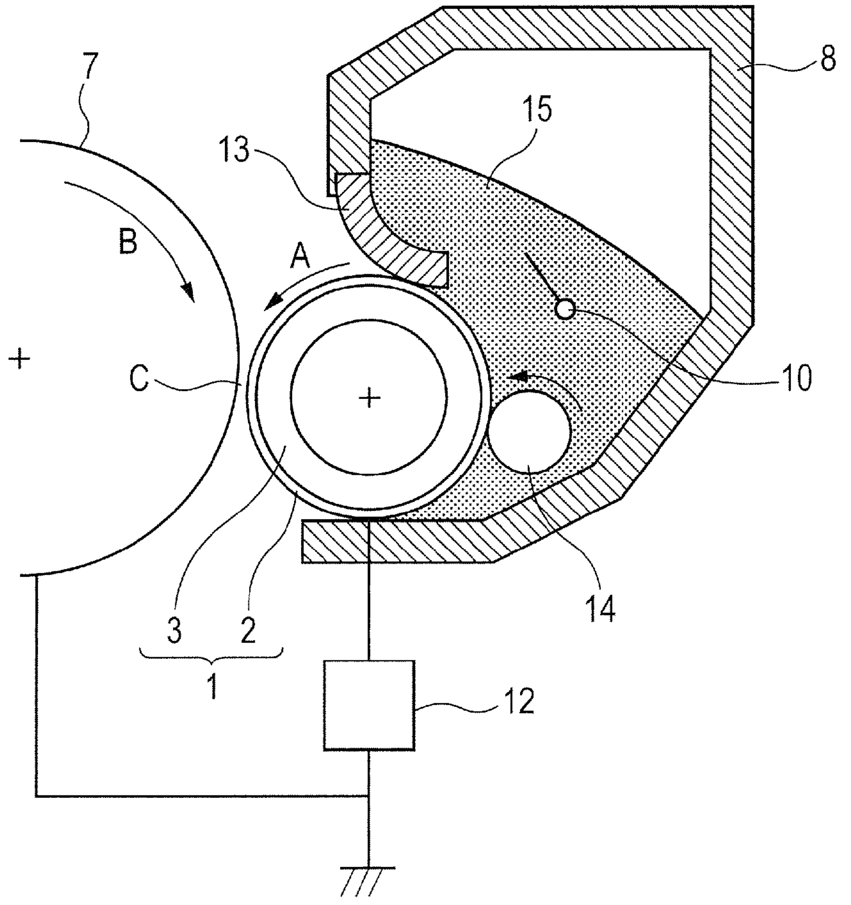
FIG. 4 is a schematic view illustrating an example of a non-magnetic, one-component developing unit using the developer carrying member according to the present invention, the unit having the elastic regulating blade incorporated therein.

FIG. 4 is a schematic sectional view illustrating still another embodiment of the developing unit according to the present invention. The developing unit illustrated in FIG. 4 is of such a configuration that a non-magnetic, one-component developer 15 is used as a developer. In the case of the non-magnetic, one-component developer, the substrate of the developer carrying member does not necessarily need to be of a cylindrical shape and may be of a columnar shape. It should be noted that an elastic roller 14 abuts on the developer carrying member, the roller supplying a new non-magnetic, one-component developer to the developer carrying member and scraping off the non-magnetic, one-component developer that returns to a hopper without being used in development. The elastic roller also serves to triboelectrically charge the non-magnetic, one-component developer together with the developer carrying member and the elastic regulating blade. The carried amount of the non-magnetic, one-component developer carried on the developer carrying member is controlled by the elastic regulating blade, and the developer is provided with a charge quantity needed for the development of the electrostatic latent image formed on the photosensitive drum. Further, the developer is conveyed to the developing region facing the photosensitive drum by the rotation of the developer carrying member. In the developing region, from the top of the developer carrying member, the non-magnetic, one-component developer flies toward, or migrates to be in contact with, the electrostatic latent image electrostatically to develop the electrostatic latent image.

The other basic configuration in the developing unit of FIG. 4 is the same as that of the developing unit illustrated in FIG. 2, and members represented by the same reference numeral are the same member.

Hereinafter, the present invention is described in more detail by way of examples. It should be noted that production examples of the polycarbodiimide represented by the structural formula (8) to be used in the production of the matrix resin (Production Examples Y-1 to Y-6 and y-1), production examples of the matrix resin (Production Examples M-1 to M-20 and m-1 to m-8), and production examples and suppliers of the electro-conductive particles and the unevenness-providing particles are described first.

1. Production Examples of Polycarbodiimide

Production Example Y-1

Materials shown in Table 1 below were loaded into a reactor and then caused to react with each other at a reaction temperature of 100° C. under the condition of reflux under the introduction of nitrogen for 5 hours. Thus, a polycarbodiimide Y-1 ($R_7{=}C_6H_{12}$) was obtained. It should be noted that part of the sample was taken out after the 5 hours of reaction and then it was confirmed by infrared spectroscopy that a peak of an isocyanate group disappeared. In addition, a solid content concentration was adjusted to 20 mass % by adding an appropriate amount of toluene after the reaction.

TABLE 1

| Material | | Part(s) by mass |
|---|---|---|
| Organic diisocyanate | 1,6-Diisocyanatohexane | 93.6 |
| Terminal blocking agent | n-Butyl isocyanate | 6.4 (Molar ratio with respect to organic diisocyanate: 0.10) |
| Catalyst | 1-Ethyl-2-phosphorene-1-oxide | 0.9 (Molar ratio with respect to organic diisocyanate: 0.10) |
| Solvent | Toluene | 500 |

Production Examples Y-2 to Y-6 and y-1

Polycarbodiimides Y-2 to Y-6 and y-1 were each obtained in the same manner as in Production Example Y-1 except that a compound shown in Table 2 was used as the organic diisocyanate.

TABLE 2

| Production Example | Organic diisocyanate | Structure of $R_7$ in formula (8) |
|---|---|---|
| Y-1 | 1,6-Diisocyanatohexane | $C_6H_{12}$ |
| Y-2 | 1,12-Diisocyanatododecane | $C_{12}H_{24}$ |
| Y-3 | 1,5-Diisocyanato-2-methylpentane | $C_5H_9(CH_3)$ |
| Y-4 | 1,3-Phenylene diisocyanate | Ph |
| Y-5 | Tolylene 2,4-diisocyanate | $(CH_3)Ph$ |
| Y-6 | Cyclohexane-1,4-diisocyanate | Cy |
| y-1 | 3,3'-Dimethyldiphenylmethane-4,4'-diisocyanate | $(CH_3)PhCH_2Ph(CH_3)$ |

Note 1:
Ph represents a phenyl group and Cy represents a cyclohexyl group.

2. Production Examples of Matrix Resin Solution

Production Example M-1

38.7 Parts by mass of dimethylaminoethyl methacrylate corresponding to the structural formula (9), 61.3 parts by mass (1 mol with respect to 1 mol of dimethylaminoethyl methacrylate) of lauryl bromide (quaternizing agent), and 100 parts by mass of ethanol were loaded into a four-necked separable flask provided with a stirring machine, a condenser, a temperature gauge, a nitrogen-introducing tube, and a dropping funnel, and were then stirred until the system became uniform. While the stirring was continued, the temperature of the resultant reaction solution was increased to 70° C. After that, dimethylaminoethyl methacrylate was quaternized by stirring the solution for 5 hours. Thus, a quaternary ammonium base-containing monomer was obtained.

Meanwhile, 14 parts by mass (1 mol with respect to 1 mol of the quaternary ammonium base-containing monomer) of acrylic acid as a copolymerizable component, 50 parts by mass of ethanol as a solvent, and 1.0 part by mass of azobisisobutyronitrile (AIBN) as a polymerization initiator were stirred until the materials became uniform. After that, the materials were loaded into the dropping funnel.

After the reaction solution had been cooled, the temperature in the reaction system was increased to 70° C. while the stirring in the flask was continued. Then, the materials loaded into the dropping funnel were added to the solution over 1 hour. After the completion of the dropping, the mixture was subjected to a reaction in a reflux state under the introduction of nitrogen for an additional five hours. 0.2 Part by mass of AIBN was further added to the mixture, followed by a reaction for 1 hour. Thus, a resin solution formed of a quaternary ammonium base-containing polymer was obtained. 60 Parts by mass (0.8 mol with respect to 1 mol of the quaternary ammonium base-containing polymer) of the polycarbodiimide Y-1 and an appropriate amount of ethanol were added to the resin solution. Thus, a matrix resin solution M-1 having a solid content concentration of 40% was obtained.

Production Examples M-2 to M-20 and m-1 to m-8

Matrix resin solutions M-2 to M-20 and m-1 to m-8 were each obtained in the same manner as in the production method of Production Example M-1 except that materials and a blending ratio were changed to conditions shown in Table 3. It should be noted that a y-2 used in the matrix resin solution m-7 is polypropylene glycol diglycidyl ether "EPIOL P-200" (trade name, manufactured by NOF CORPORATION) as a crosslinking agent that is not a polycarbodiimide.

Table 4 shows the chemical structures of matrix resin raw materials and Table 5 shows the unit ratios of the resultant matrix resins.

TABLE 3

| | Raw material for forming matrix resin | | | | | | | |
|---|---|---|---|---|---|---|---|---|
| | Quaternary ammonium base-containing polymer having carboxyl group | | | | | | | |
| | Structural formula (4) | | | | | | | |
| | Structural formula (9) | | Quaternizing agent | | Structural formula (5) | | Polycarbodiimide | |
| | Material name | Number of parts | Material name | Number of parts | Material name | Number of parts | Material name | Number of parts |
| M-1 | Dimethylaminoethyl methacrylate | 38.7 | Lauryl bromide | 61.3 | Acrylic acid | 18 | Y-1 | 24 |
| M-2 | Dimethylaminoethyl methacrylate | 38.7 | Lauryl bromide | 61.3 | Acrylic acid | 71 | Y-1 | 153 |
| M-3 | Dimethylaminoethyl methacrylate | 38.7 | Lauryl bromide | 61.3 | Acrylic acid | 2 | Y-1 | 1 |
| M-4 | Dimethylaminomethyl methacrylate | 73.9 | Methyl chloride | 26.1 | Acrylic acid | 37 | Y-1 | 51 |
| M-5 | Dimethylaminomethyl methacrylate | 30.0 | Stearyl bromide | 70.0 | Acrylic acid | 15 | Y-1 | 21 |
| M-6 | Dipentylaminomethyl methacrylate | 83.5 | Methyl chloride | 16.5 | Acrylic acid | 24 | Y-1 | 32 |
| M-7 | Dipentylaminomethyl methacrylate | 43.4 | Stearyl bromide | 56.6 | Acrylic acid | 12 | Y-1 | 17 |
| M-8 | N-dimethylaminoethylpropenamide | 73.8 | Methyl chloride | 26.2 | Acrylic acid | 37 | Y-1 | 52 |
| M-9 | N-dimethylaminoethylpropenamide | 29.9 | Stearyl bromide | 70.1 | Acrylic acid | 15 | Y-1 | 21 |
| M-10 | 4-(Dimethylamino)ethyl styrene | 77.6 | Methyl chloride | 22.4 | Acrylic acid | 32 | Y-1 | 44 |
| M-11 | 4-(Dimethylamino)ethyl styrene | 34.4 | Stearyl bromide | 65.6 | Acrylic acid | 14 | Y-1 | 20 |
| M-12 | Dipropylaminomethyl methacrylate | 79.8 | Methyl chloride | 20.2 | Acrylic acid | 29 | Y-1 | 40 |
| M-13 | Dimethylaminobutyl methacrylate | 35.7 | Stearyl bromide | 64.3 | Acrylic acid | 14 | Y-1 | 19 |
| M-14 | Dimethylaminoethyl methacrylate | 38.7 | Lauryl bromide | 61.3 | Methacrylic acid | 21 | Y-1 | 24 |
| M-15 | Dimethylaminoethyl methacrylate | 38.7 | Lauryl bromide | 61.3 | 2-Ethylacrylic acid | 25 | Y-1 | 24 |
| M-16 | Dimethylaminoethyl methacrylate | 38.7 | Lauryl bromide | 61.3 | Acrylic acid | 18 | Y-2 | 41 |
| M-17 | Dimethylaminoethyl methacrylate | 38.7 | Lauryl bromide | 61.3 | Acrylic acid | 18 | Y-3 | 24 |
| M-18 | Dimethylaminoethyl methacrylate | 38.7 | Lauryl bromide | 61.3 | Acrylic acid | 18 | Y-4 | 23 |
| M-19 | Dimethylaminoethyl methacrylate | 38.7 | Lauryl bromide | 61.3 | Acrylic acid | 18 | Y-5 | 26 |
| M-20 | Dimethylaminoethyl methacrylate | 38.7 | Lauryl bromide | 61.3 | Acrylic acid | 18 | Y-6 | 24 |
| m-1 | Dimethylaminoethyl methacrylate | 38.7 | Lauryl bromide | 61.3 | Acrylic acid | 18 | | |
| m-2 | Dipentylaminohexyl acrylate | 48.3 | Stearyl bromide | 51.7 | Acrylic acid | 11 | Y-1 | 15 |
| m-3 | Dipentylaminomethyl methacrylate | 39.6 | Docosyl bromide | 60.4 | Acrylic acid | 11 | Y-1 | 15 |
| m-4 | Dioctylaminomethyl methacrylate | 50.4 | Stearyl bromide | 49.6 | Acrylic acid | 11 | Y-1 | 15 |
| m-5 | Dimethylaminoethyl methacrylate | 38.7 | Lauryl bromide | 61.3 | | 0 | Y-1 | 24 |
| m-6 | Dimethylaminoethyl methacrylate | 62.3 | Methyl bromide | 37.7 | Acrylic acid | 29 | Y-1 | 76 |
| m-7 | Dimethylaminoethyl methacrylate | 62.3 | Methyl bromide | 37.7 | Acrylic acid | 29 | Y-2 | 61 |
| m-8 | | | | | Acrylic acid | 18 | Y-1 | 25 |

TABLE 4

| | Raw material for forming matrix resin | | | | | | | |
|---|---|---|---|---|---|---|---|---|
| | Quaternary ammonium base-containing polymer having carboxyl group | | | | | | | |
| | Structural formula (4) | | | | | | Structural formula (5) | Polycarbodiimide |
| | Structural formula (9) | | | | Quaternizing agent | | | |
| | $R_1$ | $R_2$ | $R_3/R_4$ | X | $A^-$ | $R_5$ | $R_6$ | $R_7/R_8$ |
| M-1 | $CH_3$ | $C_2H_4$ | $CH_3$ | COO | Br | $C_{12}H_{25}$ | H | $C_6H_{12}$ |
| M-2 | $CH_3$ | $C_2H_4$ | $CH_3$ | COO | Br | $C_{12}H_{25}$ | H | $C_6H_{12}$ |
| M-3 | $CH_3$ | $C_2H_4$ | $CH_3$ | COO | Br | $C_{12}H_{25}$ | H | $C_6H_{12}$ |
| M-4 | $CH_3$ | $CH_2$ | $CH_3$ | COO | Cl | $CH_3$ | H | $C_6H_{12}$ |

TABLE 4-continued

| | Raw material for forming matrix resin | | | | | | | |
|---|---|---|---|---|---|---|---|---|
| | Quaternary ammonium base-containing polymer having carboxyl group | | | | | | | |
| | Structural formula (4) | | | | | | Structural formula (5) | Polycarbodiimide |
| | Structural formula (9) | | | | Quaternizing agent | | | |
| | $R_1$ | $R_2$ | $R_3/R_4$ | X | $A^-$ | $R_5$ | $R_6$ | $R_7/R_8$ |
| M-5 | $CH_3$ | $CH_2$ | $CH_3$ | COO | Br | $C_{18}H_{37}$ | H | $C_6H_{12}$ |
| M-6 | $CH_3$ | $CH_2$ | $C_5H_{11}$ | COO | Cl | $CH_3$ | H | $C_6H_{12}$ |
| M-7 | $CH_3$ | $CH_2$ | $C_5H_{11}$ | COO | Br | $C_{18}H_{37}$ | H | $C_6H_{12}$ |
| M-8 | H | $C_2H_4$ | $CH_3$ | CONH | Cl | $CH_3$ | H | $C_6H_{12}$ |
| M-9 | H | $C_2H_4$ | $CH_3$ | CONH | Br | $C_{18}H_{37}$ | H | $C_6H_{12}$ |
| M-10 | H | $C_2H_4$ | $CH_3$ | $C_6H_4$ | Cl | $CH_3$ | H | $C_6H_{12}$ |
| M-11 | H | $C_2H_4$ | $CH_3$ | $C_6H_4$ | Br | $C_{18}H_{37}$ | H | $C_6H_{12}$ |
| M-12 | $CH_3$ | $CH_2$ | $C_3H_7$ | COO | Cl | $CH_3$ | H | $C_6H_{12}$ |
| M-13 | $CH_3$ | $C_4H_8$ | $CH_3$ | COO | Br | $C_{18}H_{37}$ | H | $C_6H_{12}$ |
| M-14 | $CH_3$ | $C_2H_4$ | $CH_3$ | COO | Br | $C_{12}H_{25}$ | $CH_3$ | $C_6H_{12}$ |
| M-15 | $CH_3$ | $C_2H_4$ | $CH_3$ | COO | Br | $C_{12}H_{25}$ | $C_2H_5$ | $C_6H_{12}$ |
| M-16 | $CH_3$ | $C_2H_4$ | $CH_3$ | COO | Br | $C_{12}H_{25}$ | H | $C_{12}H_{24}$ |
| M-17 | $CH_3$ | $C_2H_4$ | $CH_3$ | COO | Br | $C_{12}H_{25}$ | H | $C_5H_9(CH_3)$ |
| M-18 | $CH_3$ | $C_2H_4$ | $CH_3$ | COO | Br | $C_{12}H_{25}$ | H | Ph |
| M-19 | $CH_3$ | $C_2H_4$ | $CH_3$ | COO | Br | $C_{12}H_{25}$ | H | $(CH_3)Ph$ |
| M-20 | $CH_3$ | $C_2H_4$ | $CH_3$ | COO | Br | $C_{12}H_{25}$ | H | Cy |
| m-1 | $CH_3$ | $C_2H_4$ | $CH_3$ | COO | Cl | $C_{12}H_{25}$ | H | |
| m-2 | H | $C_6H_{12}$ | $C_5H_{11}$ | COO | Br | $C_{18}H_{37}$ | H | $C_6H_{12}$ |
| m-3 | $CH_3$ | $CH_2$ | $C_5H_{11}$ | COO | Br | $C_{22}H_{45}$ | H | $C_6H_{12}$ |
| m-4 | $CH_3$ | $CH_2$ | $C_8H_7$ | COO | Br | $C_{18}H_{37}$ | H | $C_6H_{12}$ |
| m-5 | $CH_3$ | $C_2H_4$ | $CH_3$ | COO | Br | $C_{12}H_{25}$ | | $C_6H_{12}$ |
| m-6 | $CH_3$ | $C_2H_4$ | $CH_3$ | COO | Br | $CH_3$ | H | $(CH_3)PhCH_2Ph(CH_3)$ |
| m-7 | $CH_3$ | $C_2H_4$ | $CH_3$ | COO | Br | $CH_3$ | H | Polypropylene glycol diglycidyl ether |
| m-8 | | | | | | | H | $C_6H_{12}$ |

TABLE 5

| | Unit ratio of matrix resin | |
|---|---|---|
| | X(X + Y) | Z/Y |
| M-1 | 0.5 | 0.8 |
| M-2 | 0.2 | 1.2 |
| M-3 | 0.9 | 0.2 |
| M-4 | 0.5 | 0.8 |
| M-5 | 0.5 | 0.8 |
| M-6 | 0.5 | 0.8 |
| M-7 | 0.5 | 0.8 |
| M-8 | 0.5 | 0.8 |
| M-9 | 0.5 | 0.8 |
| M-10 | 0.5 | 0.8 |
| M-11 | 0.5 | 0.8 |
| M-12 | 0.5 | 0.8 |
| M-13 | 0.5 | 0.8 |
| M-14 | 0.5 | 0.8 |
| M-15 | 0.5 | 0.8 |
| M-16 | 0.5 | 0.8 |
| M-17 | 0.5 | 0.8 |
| M-18 | 0.5 | 0.8 |
| M-19 | 0.5 | 0.8 |
| M-20 | 0.5 | 0.8 |
| m-1 | 0.5 | |
| m-2 | 0.5 | 0.8 |
| m-3 | 0.5 | 0.8 |
| m-4 | 0.5 | 0.8 |
| m-5 | 0.5 | 0.8 |
| m-6 | 0.5 | 0.8 |
| m-7 | 0.5 | 0.8 |
| m-8 | 0 | 0.8 |

3. Electro-Conductive Particles

The following particles were used as electro-conductive particles to be used in the surface layer of a developer carrying member.

(Electro-Conductive Particles 1)

Carbon black: TOKABLACK #5500 (trade name, manufactured by TOKAI CARBON CO., LTD.) was defined as electro-conductive particles 1.

(Electro-Conductive Particles 2)

A mixture of coke and tar pitch was used as a raw material. The mixture was kneaded at a temperature equal to or more than the softening point of tar pitch, subjected to extrusion molding, and subjected to primary calcining under a nitrogen atmosphere at a temperature of 1,000° C. Subsequently, the resultant was impregnated with coal-tar pitch and then subjected to secondary calcining under a nitrogen atmosphere at a temperature of 2,800° C. to be graphitized. Further, the graphitized product was pulverized and classified. The resultant particles having a number-average particle diameter of 5.4 μm were defined as electro-conductive particles 2.

4. Unevenness-Forming Particles

Particles shown in Table 6 below were prepared as unevenness-providing particles for the surface layer of a developer carrying member.

TABLE 6

| | |
|---|---|
| Unevenness-providing particles 1 | Acrylic resin particles (trade name: MX-1000, manufactured by Soken Chemical & Engineering Co., Ltd.) |

TABLE 6-continued

| | |
|---|---|
| Unevenness-providing particles 2 | Acrylic resin particles (trade name: MX-5000, manufactured by Soken Chemical & Engineering Co., Ltd.) |

Example 1

1. Production of Developer Carrying Member

250 Parts by mass (100 parts by mass in terms of solid content) of the matrix resin solution M-1, 20 parts by mass of the electro-conductive particles 1, 60 parts by mass of the electro-conductive particles 2, and 25 parts by mass of the unevenness-forming particles 1 were used. 230 Parts by mass of methanol were added to the materials to adjust the solid content concentration to 35 mass %. The materials were dispersed with a sand mill "Sand Grinder LSG-4U-08" (apparatus name, manufactured by AIMEX CO., Ltd.) using glass beads each having a diameter of 1 mm as media particles for 2 hours, and then the glass beads were separated with a sieve. Thus, a paint was obtained.

The paint was applied onto a polyethylene terephthalate sheet having a thickness of 100 μm, and then the applied layer was heated in a hot-air drying furnace at a temperature of 150° C. for 30 minutes to be cured. Thus, a cured layer having a thickness of 7 μm to 20 μm was formed. The volume resistivity of the cured layer was measured with a resistivity meter (trade name: Loresta AP, manufactured by Mitsubishi Chemical Analytech Co., Ltd.) by a four-point probe method. The measurement was performed under an environment having a temperature of 20° C. and a humidity of 50% RH. The value is defined as the volume resistivity of a surface layer.

Next, a cylindrical tube made of aluminum that had been ground to have a total length of 330 mm, an outer diameter of 16.0 mm, and an arithmetic-mean roughness Ra of 0.2 μm, and whose upper and lower end portions each having a length of 10 mm had been masked was prepared as a substrate. The substrate was vertically raised and rotated at a constant speed, and then the paint was applied from a spray gun, which had been set so as to eject the paint, to the surface of the substrate while the spray gun was lowered at a constant speed. Subsequently, the surface layer was formed on the substrate by heating the applied layer in a hot-air drying furnace at a temperature of 150° C. for 30 minutes to cure the layer. Thus, a developer carrying member S-1 was produced.

2. Evaluations of Developer Carrying Member

A laser beam printer (trade name: Laser Jet P3015n, manufactured by Hewlett-Packard Company) and its genuine cartridge were prepared. The cartridge is of such a configuration having an elastic regulating blade in a developing unit as illustrated in FIG. 3. A magnet and a flange were attached to the developer carrying member S-1, and then the member was mounted on the cartridge. The cartridge was loaded into the laser beam printer and then 50 electrophotographic images were output according to an intermittent mode of 1 image/5 seconds. The electrophotographic images were each such that an alphabetical letter "E" having a size of 4 points was formed on A4-size paper so as to have a print percentage of 1%. Such image is referred to as "1% E-letter image." Subsequently, 1 solid black image, 1 solid white image, and 1 solid black image were sequentially output. The solid black image, the solid white image, and the solid black image thus obtained are referred to as "51st image," "52nd image," and "53rd image," respectively.

Further, subsequently, 19,950 1% E-letter images were output, and then 1 solid black image, 1 solid white image, and 1 solid black image were sequentially output. The solid black image, the solid white image, and the solid black image thus obtained are referred to as "20,004th image," "20,005th image," and "20,006th image," respectively in the stated order. It should be noted that the output was performed under a high-temperature, high-humidity environment (having a temperature of 32.5° C. and a relative humidity of 80%).

(Evaluation 1) Image Density

The relative densities of the solid black portions of the 51st image and the 20,004th image (each of which was a solid black image) when the density of a white portion was defined as 0.00 were measured with a reflection densitometer (trade name: RD918, manufactured by Macbeth). It should be noted that 10 arbitrary points of each image to be evaluated were subjected to the measurement and the arithmetic average of the measured values was defined as the image density of the image to be evaluated. Then, a value calculated from an equation "$(|(G\mathbf{1}-G\mathbf{2})|/G\mathbf{1})\times 100(\%)$" where G1 represented the image density of the 51st image and G2 represented the image density of the 20,004th image was defined as a density change ratio (%).

(Evaluation 2) Fogging

The fogging densities (%) of the 52nd image and the 20,005th image (each of which was a solid white image) were each calculated with a digital white-light photometer (trade name: REFLECTOMETER MODEL TC-6DS, manufactured by Tokyo Denshoku CO., LTD.) from a difference between the whiteness of the white portion of the image and the whiteness of the paper itself.

(Evaluation 3) Outer Diameter of Developer Carrying Member and Amount of Wearing of its Surface Layer The amount of wearing of the surface layer of the developer carrying member S-1 taken out of the cartridge after the output of the 20,006 images was measured by the following method.

That is, outer diameters at respective points obtained by equally dividing the brand-new developer carrying member S-1 into 30 sections in its longitudinal direction were measured with a digital dimension-measuring device (trade name: LS-7070M, manufactured by KEYENCE CORPORATION) placed on a vibration isolation table, and the arithmetic average of the outer diameters at the 30 respective points was defined as an outer diameter d1 of the brand-new developer carrying member S-1. Next, the developer carrying member S-1 was taken out of the cartridge after the output of the 20,006 images and then the developer on its surface was removed by air blowing. After that, its outer diameters were measured by the method and then an outer diameter d2 of the developer carrying member S-1 subjected to the image formation was calculated. Then, a value calculated from an equation "$(d\mathbf{1}-d\mathbf{2})/2$" was defined as the amount of wearing of the surface layer of the developer carrying member.

(Evaluation 4) Change Ratio of Arithmetic-Mean Roughness (Ra) of Surface of Developer Carrying Member 3 Sites in the axial direction of the brand-new developer carrying member S-1 (the central portion and positions distant from the central portion by 60 mm each toward both ends), and 6 sites in the circumferential direction thereof (arranged at an interval of 60°), i.e., a total of 18 sites were measured for the arithmetic-mean roughness (Ra) with a surface roughness-measuring device (trade name: SURFCORDER SE-3500, manufactured by Kosaka Laboratory Ltd.) according to JIS B0601-2001, and the average of the measured values was defined as an arithmetic-mean roughness Ra1. It should be noted that the measurement was performed under the conditions of a cutoff of 0.8 mm, a measurement distance of 8.0 mm, and a feed speed of 0.5 mm/sec.

An arithmetic-mean roughness Ra2 of the surface of the developer carrying member S-1 taken out of the cartridge after the output of the 20,006 images was similarly measured. Then, a value calculated from an equation "(Ra1−Ra2)/Ra1×100(%)" was defined as a change ratio (%).

(Evaluation 5) Triboelectric Charge Quantity of Developer on Developer Carrying Member An image-forming process was stopped in the midst of the output of each of the 53rd image and the 20,006th image (each of which was a solid black image), and then the developer on the surface of the developer carrying member was sucked and collected with a metal cylindrical tube and a cylindrical filter. At that time, a charge quantity Q stored in a capacitor through the metal cylindrical tube and a mass M of the collected developer were measured. A charge quantity Q/M (mC/kg) per unit mass was calculated from those values and defined as the triboelectric charge quantity of the developer.

Examples 2 to 13 and Comparative Examples 1 to 4

The volume resistivity of a surface layer was measured, and developer carrying members S-2 to S-13 and S'-1 to S'-4 were each produced in the same manner as in Example 1 except that the kinds and amounts of the matrix resin solution, the electro-conductive particles, and the unevenness-forming particles to be used were changed to those shown in Table 7. Table 7 shows the volume resistivity of the surface layer according to each developer carrying member, and Table 8 and Table 9 show the results of (Evaluation 1) to (Evaluation 5) described above.

TABLE 7

| | Diameter of substrate (mm) | Matrix resin solution Kind | Matrix resin solution Part(s) by mass | Electro-conductive particles No. | Part(s) by mass | No. | Part(s) by mass | Unevenness-forming particles No. | Part(s) by mass | Volume resistivity Ω · cm |
|---|---|---|---|---|---|---|---|---|---|---|
| S-1 | 16 | M-1 | 100 | 1 | 20 | 2 | 60 | 1 | 25 | 0.84 |
| S-2 | 16 | M-2 | 100 | 1 | 20 | 2 | 60 | 1 | 25 | 0.88 |
| S-3 | 16 | M-3 | 100 | 1 | 20 | 2 | 60 | 1 | 25 | 0.85 |
| S-4 | 16 | M-4 | 100 | 1 | 20 | 2 | 60 | 1 | 25 | 0.82 |
| S-5 | 16 | M-5 | 100 | 1 | 20 | 2 | 60 | 1 | 25 | 0.86 |
| S-6 | 16 | M-6 | 100 | 1 | 20 | 2 | 60 | 1 | 25 | 0.85 |
| S-7 | 16 | M-7 | 100 | 1 | 20 | 2 | 60 | 1 | 25 | 0.85 |
| S-8 | 16 | M-8 | 100 | 1 | 20 | 2 | 60 | 1 | 25 | 0.83 |
| S-9 | 16 | M-9 | 100 | 1 | 20 | 2 | 60 | 1 | 25 | 0.84 |
| S-10 | 16 | M-10 | 100 | 1 | 20 | 2 | 60 | 1 | 25 | 0.81 |
| S-11 | 16 | M-11 | 100 | 1 | 20 | 2 | 60 | 1 | 25 | 0.83 |
| S-12 | 16 | M-12 | 100 | 1 | 20 | 2 | 60 | 1 | 25 | 0.81 |
| S-13 | 16 | M-13 | 100 | 1 | 20 | 2 | 60 | 1 | 25 | 0.84 |
| S'-1 | 16 | m-1 | 100 | 1 | 20 | 2 | 60 | 1 | 25 | 0.85 |
| S'-2 | 16 | m-2 | 100 | 1 | 20 | 2 | 60 | 1 | 25 | 0.85 |
| S'-3 | 16 | m-3 | 100 | 1 | 20 | 2 | 60 | 1 | 25 | 0.83 |
| S'-4 | 16 | m-4 | 100 | 1 | 20 | 2 | 60 | 1 | 25 | 0.84 |

TABLE 8

| | Developer carrying member | Image density Initial stage | Image density After endurance | Density change ratio (%) | Fogging Initial stage | Fogging After endurance |
|---|---|---|---|---|---|---|
| Example 1 | S-1 | 1.50 | 1.48 | 1.3 | 0.3% | 0.3% |
| Example 2 | S-2 | 1.45 | 1.36 | 6.2 | 0.2% | 0.3% |
| Example 3 | S-3 | 1.45 | 1.35 | 6.9 | 1.2% | 1.5% |
| Example 4 | S-4 | 1.45 | 1.42 | 2.1 | 0.3% | 0.4% |
| Example 5 | S-5 | 1.50 | 1.42 | 5.3 | 0.7% | 0.8% |
| Example 6 | S-6 | 1.48 | 1.42 | 4.1 | 0.3% | 0.7% |
| Example 7 | S-7 | 1.50 | 1.37 | 8.7 | 0.6% | 0.7% |
| Example 8 | S-8 | 1.46 | 1.42 | 2.7 | 0.3% | 0.3% |
| Example 9 | S-9 | 1.50 | 1.41 | 6.0 | 0.6% | 0.8% |
| Example 10 | S-10 | 1.46 | 1.42 | 2.7 | 0.3% | 0.3% |
| Example 11 | S-11 | 1.48 | 1.40 | 5.4 | 0.6% | 0.7% |
| Example 12 | S-12 | 1.45 | 1.42 | 2.1 | 0.3% | 0.4% |
| Example 13 | S-13 | 1.48 | 1.38 | 6.8 | 0.7% | 0.7% |
| Comparative Example 1 | S'-1 | 1.48 | 0.81 | 45.3 | 0.3% | 4.8% |
| Comparative Example 2 | S'-2 | 1.47 | 1.07 | 27.2 | 0.3% | 3.8% |
| Comparative Example 3 | S'-3 | 1.48 | 1.12 | 24.3 | 0.3% | 3.5% |
| Comparative Example 4 | S'-4 | 1.46 | 1.05 | 28.1 | 0.2% | 3.6% |

TABLE 9

| | Developer carrying member | Wearing Amount of wearing (μm) | Ra Initial stage (μm) | Ra After endurance (μm) | Change ratio (%) | Triboelectric charge quantity of developer (mC/kg) Initial stage | After endurance |
|---|---|---|---|---|---|---|---|
| Example 1 | S-1 | 0.36 | 1.47 | 1.40 | 5% | −17.2 | −18.5 |
| Example 2 | S-2 | 0.21 | 1.46 | 1.38 | 5% | −13.6 | −14.5 |
| Example 3 | S-3 | 1.53 | 1.46 | 1.28 | 12% | −19.6 | −22.4 |
| Example 4 | S-4 | 0.30 | 1.46 | 1.41 | 3% | −14.3 | −15.5 |
| Example 5 | S-5 | 0.76 | 1.42 | 1.32 | 7% | −18.8 | −20.6 |
| Example 6 | S-6 | 0.81 | 1.41 | 1.31 | 7% | −15.5 | −16.7 |
| Example 7 | S-7 | 1.54 | 1.44 | 1.24 | 14% | −19.5 | −21.0 |
| Example 8 | S-8 | 0.35 | 1.43 | 1.39 | 3% | −14.5 | −15.9 |
| Example 9 | S-9 | 0.83 | 1.42 | 1.32 | 7% | −18.6 | −20.4 |
| Example 10 | S-10 | 0.38 | 1.48 | 1.41 | 5% | −14.6 | −16.2 |
| Example 11 | S-11 | 0.92 | 1.42 | 1.32 | 7% | −18.8 | −20.6 |
| Example 12 | S-12 | 0.36 | 1.43 | 1.38 | 3% | −14.7 | −15.8 |
| Example 13 | S-13 | 1.62 | 1.45 | 1.25 | 14% | −19.7 | −21.4 |
| Comparative Example 1 | S'-1 | 5.83 | 1.41 | 0.92 | 35% | −15.2 | −29.6 |
| Comparative Example 2 | S'-2 | 4.32 | 1.42 | 1.02 | 28% | −16.8 | −25.2 |
| Comparative Example 3 | S'-3 | 4.33 | 1.43 | 1.05 | 27% | −16.5 | −24.2 |
| Comparative Example 4 | S'-4 | 4.25 | 1.42 | 1.02 | 28% | −17.2 | −25.2 |

Examples 14 to 20 and Comparative Examples 5 to 8

1. Production of Developer Carrying Member

Developer carrying members S-14 to S-20 and S'-5 to S'-8 were each obtained in the same manner as in Example 1 except that: the outer diameter of the substrate to be used was changed to that shown in Table 10; and the kinds and amounts of the matrix resin solution, the electro-conductive particles, and the unevenness-forming particles to be used were changed to those shown in Table 10.

TABLE 10

| | Diameter of substrate (mm) | Matrix resin solution Kind | Part(s) by mass | Electro-conductive particles No. | Part(s) by mass | No. | Part(s) by mass | Unevenness-forming particles No. | Part(s) by mass | Volume resistivity Ω · cm |
|---|---|---|---|---|---|---|---|---|---|---|
| S-14 | 24.5 | M-14 | 100 | 1 | 15 | 2 | 55 | 2 | 33 | 1.22 |
| S-15 | 24.5 | M-15 | 100 | 1 | 15 | 2 | 55 | 2 | 33 | 1.25 |
| S-16 | 24.5 | M-16 | 100 | 1 | 15 | 2 | 55 | 2 | 33 | 1.21 |
| S-17 | 24.5 | M-17 | 100 | 1 | 15 | 2 | 55 | 2 | 33 | 1.25 |
| S-18 | 24.5 | M-18 | 100 | 1 | 15 | 2 | 55 | 2 | 33 | 1.22 |
| S-19 | 24.5 | M-19 | 100 | 1 | 15 | 2 | 55 | 2 | 33 | 1.20 |
| S-20 | 24.5 | M-20 | 100 | 1 | 15 | 2 | 55 | 2 | 33 | 1.18 |
| S'-5 | 24.5 | m-5 | 100 | 1 | 15 | 2 | 55 | 2 | 33 | 1.23 |
| S'-6 | 24.5 | m-6 | 100 | 1 | 15 | 2 | 55 | 2 | 33 | 1.22 |
| S'-7 | 24.5 | m-7 | 100 | 1 | 15 | 2 | 55 | 2 | 33 | 1.20 |
| S'-8 | 24.5 | m-8 | 100 | 1 | 15 | 2 | 55 | 2 | 33 | 1.21 |

2. Evaluations of Developer Carrying Member

A digital copying machine (trade name: iR5075N, manufactured by Canon Inc.), and its genuine developer and developing device were prepared. It should be noted that the developing device is of such a configuration having a magnetic regulating blade in a developing unit as illustrated in FIG. 2.

A magnet and a flange were attached to each developer carrying member so that the developer carrying member could be mounted on the developing device, and then the developer carrying member was mounted on the developing device. It should be noted that a gap between the magnetic blade and the developer carrying member was set to 250 μm. 50 Electrophotographic images were output with the digital copying machine. The electrophotographic images were each such that an alphabetical letter "E" having a size of 4 points was formed on A4-size paper so as to have a print percentage of 4%. Such image is referred to as "4% E-letter image." Subsequently, 1 solid black image, 1 solid white image, and a 4% E-letter image were sequentially output. The solid black image, the solid white image, and the 4% E-letter image thus obtained are referred to as “51st image,” “52nd image,” and “53rd image,” respectively in the stated order.

Further, subsequently, 1,000,000 4% E-letter images were output, and then 1 solid black image, 1 solid white image, and a 4% E-letter image were sequentially output. The solid black image, the solid white image, and the 4% E-letter image thus obtained are referred to as “1,000,004th image,” “1,000,005th image,” and “1,000,006th image,” respectively in the stated order. The output was performed under a high-temperature, high-humidity environment (having a temperature of 30° C. and a relative humidity of 80%). Hereinafter, evaluations were performed in conformity with Evaluation 1 to Evaluation 5 of Example 1. It should be noted that the triboelectric charge quantity of a developer according to (Evaluation 5) was measured and calculated by sucking and collecting toner on the developer carrying member after the formation of each of the 53rd image and the 1,000,006th image. Table 11 and Table 12 show the results.

TABLE 11

| | Developer carrying member | Image density Initial stage | Image density After endurance | Density change ratio (%) | Fogging Initial stage | Fogging After endurance |
|---|---|---|---|---|---|---|
| Example 14 | S-14 | 1.50 | 1.47 | 2.0 | 0.3% | 0.3% |
| Example 15 | S-15 | 1.50 | 1.46 | 2.7 | 0.3% | 0.4% |
| Example 16 | S-16 | 1.48 | 1.42 | 4.1 | 0.2% | 0.4% |
| Example 17 | S-17 | 1.48 | 1.46 | 1.4 | 0.3% | 0.4% |
| Example 18 | S-18 | 1.46 | 1.35 | 7.5 | 0.2% | 1.2% |
| Example 19 | S-19 | 1.42 | 1.30 | 8.5 | 0.3% | 1.5% |
| Example 20 | S-20 | 1.43 | 1.30 | 9.1 | 0.3% | 1.5% |
| Comparative Example 5 | S'-5 | 1.46 | 1.03 | 29.5 | 0.3% | 3.7% |
| Comparative Example 6 | S'-6 | 1.24 | 1.05 | 15.3 | 1.6% | 3.2% |
| Comparative Example 7 | S'-7 | 1.12 | 0.95 | 15.2 | 1.8% | 4.2% |
| Comparative Example 8 | S'-8 | 1.46 | 1.12 | 23.3 | 0.3% | 3.5% |

TABLE 12

| | Developer carrying member | Wearing Amount of wearing (μm) | Ra Initial stage (μm) | Ra After endurance (μm) | Change ratio (%) | Triboelectric charge quantity of developer (mC/kg) Initial stage | Triboelectric charge quantity of developer (mC/kg) After endurance |
|---|---|---|---|---|---|---|---|
| Example 14 | S-14 | 0.62 | 0.73 | 0.71 | 3% | −16.5 | −17.5 |
| Example 15 | S-15 | 0.82 | 0.75 | 0.71 | 5% | −16.1 | −17.0 |
| Example 16 | S-16 | 0.85 | 0.72 | 0.68 | 6% | −15.8 | −16.9 |
| Example 17 | S-17 | 0.58 | 0.71 | 0.68 | 4% | −16.4 | −17.6 |
| Example 18 | S-18 | 1.23 | 0.76 | 0.65 | 14% | −15.9 | −19.2 |
| Example 19 | S-19 | 1.42 | 0.78 | 0.66 | 15% | −15.8 | −19.6 |
| Example 20 | S-20 | 1.41 | 0.75 | 0.66 | 12% | −15.5 | −19.6 |
| Comparative Example 5 | S'-5 | 4.82 | 0.73 | 0.43 | 41% | −17.5 | −24.5 |
| Comparative Example 6 | S'-6 | 1.22 | 0.74 | 0.70 | 5% | −12.2 | −13.3 |
| Comparative Example 7 | S'-7 | 1.13 | 0.72 | 0.68 | 6% | −8.6 | −9.7 |
| Comparative Example 8 | S'-8 | 4.63 | 0.73 | 0.55 | 25% | −16.1 | −24.6 |

Examples 21 and 22, and Comparative Examples 9 and 10

1. Production of Developer Carrying Member

Developer carrying members S-21 and S-22, and S'-9 and S'-10 were each obtained in the same manner as in Example 1 except that: the outer diameter of the substrate to be used was changed to that shown in Table 13; and the kinds and amounts of the matrix resin solution, the electro-conductive particles, and the unevenness-forming particles to be used were changed to those shown in Table 13.

TABLE 13

| | Diameter of substrate (mm) | Matrix resin solution Kind | Part(s) by mass | Electro-conductive particles No. | Part(s) by mass | No. | Part(s) by mass | Unevenness-forming particles No. | Part(s) by mass | Volume resistivity Ω · cm |
|---|---|---|---|---|---|---|---|---|---|---|
| S-21 | 20 | M-1 | 100 | 1 | 4 | 2 | 30 | 2 | 10 | 18.5 |
| S-22 | 20 | M-4 | 100 | 1 | 4 | 2 | 30 | 2 | 10 | 17.9 |
| S'-9 | 20 | m-1 | 100 | 1 | 4 | 2 | 30 | 2 | 10 | 18.5 |
| S'-10 | 20 | m-2 | 100 | 1 | 4 | 2 | 30 | 2 | 10 | 18.9 |

2. Evaluations of Developer Carrying Member

A laser beam printer (trade name: LBP2160, manufactured by Canon Inc.) and its genuine cartridge (cyan) "EP-82" (trade name, manufactured by Canon Inc.) were prepared. It should be noted that the cartridge is of such a configuration having a non-magnetic, one-component developer in a developing unit as illustrated in FIG. 4. Each developer carrying member was mounted on the cartridge and then the cartridge was loaded into the laser beam printer. Evaluations were performed in the same manner as in Example 1 except that the laser beam printer was used. Table 14 and Table 15 show the results of the evaluations.

TABLE 14

| | Developer carrying member | Image density Initial stage | After endurance | Density change ratio (%) | Fogging Initial stage | After endurance |
|---|---|---|---|---|---|---|
| Example 21 | S-21 | 1.50 | 1.47 | 2.0 | 0.5% | 0.5% |
| Example 22 | S-22 | 1.48 | 1.42 | 4.1 | 0.5% | 0.6% |
| Comparative Example 9 | S'-9 | 1.47 | 0.82 | 44.2 | 0.3% | 4.8% |
| Comparative Example 10 | S'-10 | 1.48 | 1.05 | 29.1 | 0.3% | 3.8% |

TABLE 15

| | Developer carrying member | Wearing Amount of wearing (μm) | Ra Initial stage (μm) | After endurance (μm) | Change ratio (%) | Triboelectric charge quantity of developer (mC/kg) Initial stage | After endurance |
|---|---|---|---|---|---|---|---|
| Example 21 | S-21 | 0.41 | 0.82 | 0.77 | 6% | −32.4 | −35.3 |
| Example 22 | S-22 | 0.37 | 0.84 | 0.80 | 5% | −33.2 | −36.4 |
| Comparative Example 9 | S'-9 | 5.56 | 0.85 | 0.62 | 27% | −33.5 | −49.6 |
| Comparative Example 10 | S'-10 | 4.26 | 0.85 | 0.66 | 22% | −33.4 | −46.2 |

Summary of Results of Evaluations

Good results were obtained in Example 1 to Example 22.

In each of Comparative Example 1 and Comparative Example 9, the polycarbodiimide as a crosslinking agent was not used, and hence no three-dimensional crosslinked structure was formed and durability did not become sufficient. Accordingly, the durability of the surface layer of the developer carrying member was poor, and as a result, the image density, the fogging, and the amount of wearing after the endurance were bad, and a change in triboelectric charge quantity of the developer was large.

In each of Comparative Example 2 and Comparative Example 10, the number of carbon atoms of $R_2$ of the quaternary ammonium base-containing polymer was as large as 6, and hence a condensation reaction hardly occurred and a three-dimensional crosslinked structure was insufficient. Accordingly, the durability of the surface layer of the developer carrying member was poor, and as a result, the image density, the fogging, and the amount of wearing after the endurance were bad, and a change in triboelectric charge quantity of the developer was large.

In Comparative Example 3, the number of carbon atoms of $R_5$ of the quaternary ammonium base-containing polymer was as large as 22, and hence a condensation reaction hardly occurred and a three-dimensional crosslinked structure was insufficient. Accordingly, the durability of the surface layer of the developer carrying member was poor, and as a result, the image density, the fogging, and the amount of wearing after the endurance were bad, and a change in triboelectric charge quantity of the developer was large.

In Comparative Example 4, the number of carbon atoms of each of $R_3$ and $R_4$ of the quaternary ammonium base-containing polymer was as large as 8, and hence a condensation reaction hardly occurred and a three-dimensional crosslinked structure was insufficient. Accordingly, the durability of the surface layer of the developer carrying member was poor, and as a result, the image density, the fogging, and the amount of wearing after the endurance were bad, and a change in triboelectric charge quantity of the developer was large.

In Comparative Example 5, the quaternary ammonium base-containing polymer was free of a carboxyl group capable of reacting with a crosslinking agent in its structure, and hence no condensation reaction occurred and no three-dimensional crosslinked structure was formed. Accordingly, the durability of the surface layer of the developer carrying member was poor, and as a result, the image density, the fogging, and the amount of wearing after the endurance were bad, and a change in triboelectric charge quantity of the developer was large.

In Comparative Example 6, the crosslinking agent free of a nitrogen atom in itself was used, and hence triboelectric charge-providing performance did not become sufficient. Accordingly, the developer could not be provided with a sufficient triboelectric charge quantity, and the image densities before and after the endurance, and the fogging after the endurance were bad.

In Comparative Example 7, there was no quaternary ammonium base-containing unit, and hence triboelectric charge-providing performance did not become sufficient. Accordingly, the developer could not be provided with a sufficient triboelectric charge quantity, and the image densities before and after the endurance, and the fogging after the endurance were bad.

In Comparative Example 8, the number of carbon atoms of $R_7$ of the polycarbodiimide was as large as 15, and hence a condensation reaction hardly occurred and a three-dimensional crosslinked structure was insufficient. Accordingly, the durability of the surface layer of the developer carrying member was poor, and as a result, the image density, the fogging, and the amount of wearing after the endurance were bad, and a change in triboelectric charge quantity of the developer was large.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-193805, filed Sep. 6, 2011, which is hereby incorporated by reference herein in its entirety.

What is claimed is:

1. A developer carrying member, comprising:

a substrate; and a surface layer, wherein:

the surface layer contains a matrix resin and electro-conductive particles; and the matrix resin contains a crosslinked product of a polymer chain having units represented by the following structural formula (1) and the following structural formula (2), and a polymer chain represented by the following structural formula (3):

(1)

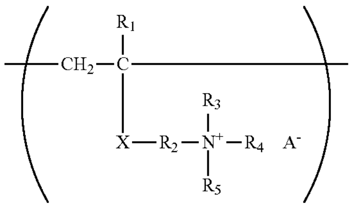

-continued (2)

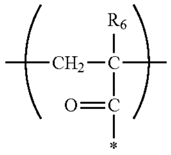

(3)

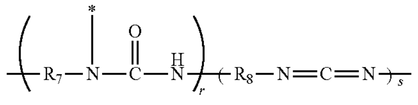

in the structural formula (1), $R_1$ represents a hydrogen atom or a methyl group, $R_2$ represents an alkylene group having 1 or more and 4 or less carbon atoms, at least one of $R_3$, $R_4$, and $R_5$ represents an alkyl group having 1 or more and 18 or less carbon atoms, and any other group represents an alkyl group having 1 or more and 5 or less carbon atoms, and $A^-$ represents an anion, in the structural formula (2), $R_6$ represents a hydrogen atom, a methyl group, or an ethyl group, in the structural formula (3), $R_7$ and $R_8$ each independently represent a hydrocarbon group having 1 or more and 12 or less carbon atoms, X represents one of —COO—, —CONH—, and —$C_6H_4$—, r represents an integer of 1 or more, and s represents 0, or an integer of 1 or more, and

* in each of the structural formulae (2) and (3) represents a bonding site of the structural formula (2) and the structural formula (3).

2. The developer carrying member according to claim 1, wherein when contents of the unit represented by the structural formula (1), the unit represented by the structural formula (2), and the unit represented by the structural formula (3) in the matrix resin are represented by X, Y, and Z, respectively, a ratio X/(X+Y) is 0.2 or more and 0.9 or less, and a ratio Z/Y is 0.4 or more and 1.2 or less.

3. The developer carrying member according to claim 2, wherein the ratio X/(X+Y) is 0.4 or more and 0.7 or less, and the ratio Z/Y is 0.6 or more and 1.0 or less.

4. A developing unit, comprising:

the developer carrying member according to claim 1; and a developer layer thickness regulating member.

5. The developing unit according to claim 4, wherein the developer layer thickness regulating member is an elastic blade and is brought into press contact with a surface of the developer carrying member.

6. The developing unit according to claim 4, wherein the developer layer thickness regulating member is placed opposite to the developer carrying member with a gap width of 50 to 500 μm from a surface of the developer carrying member.

7. The developing unit according to claim 6, wherein the developer layer thickness regulating member is a magnetic blade made of a ferromagnetic metal.

8. The developing unit according to claim 4, further comprising a developer container storing a magnetic developer.

* * * * *